(12) United States Patent
Dokken et al.

(10) Patent No.: US 12,332,354 B2
(45) Date of Patent: Jun. 17, 2025

(54) SYSTEM FOR DETECTING PLASTICS, MACRO-PLASTICS, MICRO-PLASTICS, AND NANO-PLASTICS IN A MARITIME, ESTUATRY, OR RIVER ENVIRONMENT

(71) Applicant: Ladar Limited, The Valley (AI)

(72) Inventors: Sverre Dokken, Monaco (MC); Jens Hjelmstad, Lillestrom (NO); Alexis Michael, Limassol (CY); Carlos Eduardo Machado Dos Santos Pinto, São João das Lampas (PT); Siegfried Schmuck, Anderlecht (BE)

(73) Assignee: Ladar Limited, The Valley (AI)

( * ) Notice: Subject to any disclaimer, the term of this patent is extended or adjusted under 35 U.S.C. 154(b) by 1166 days.

(21) Appl. No.: 17/171,052

(22) Filed: Feb. 9, 2021

(65) Prior Publication Data

US 2022/0252728 A1    Aug. 11, 2022

(51) Int. Cl.
| | |
|---|---|
| *G01N 21/64* | (2006.01) |
| *G01C 13/00* | (2006.01) |
| *G01N 21/31* | (2006.01) |
| *G01N 21/47* | (2006.01) |
| *G01N 21/65* | (2006.01) |
| *G01S 17/86* | (2020.01) |
| *G01S 17/87* | (2020.01) |
| *G01S 17/89* | (2020.01) |

(Continued)

(52) U.S. Cl.
CPC .............. *G01S 17/89* (2013.01); *G01C 13/00* (2013.01); *G01N 21/31* (2013.01); *G01N 21/47* (2013.01); *G01N 21/64* (2013.01); *G01N 21/65* (2013.01); *G01S 17/86* (2020.01); *G01S 17/87* (2013.01); *G01S 19/14* (2013.01); *G06N 20/00* (2019.01)

(58) Field of Classification Search
CPC .......... G01S 17/89; G01S 19/14; G01S 17/86; G01S 17/87; G01S 13/865; G01S 17/88; G01N 21/64; G01N 21/65; G01N 21/31; G01N 21/47; G01N 15/075; G01N 15/0227; G01N 15/06; G01N 2015/0038; G01N 2015/0053; G01N 2021/4733; G01N 21/94; G01N 21/85; G06N 20/00; G01C 13/00
USPC ........................................................ 356/4.01
See application file for complete search history.

(56) References Cited

U.S. PATENT DOCUMENTS 10,046,983 B2 *   8/2018   De Luca ................. E02B 15/08

OTHER PUBLICATIONS

Translation of abstract of CN111474132 Jiang et al 2020, created Feb. 7, 2025, 1 page. (Year: 2020).*

(Continued)

*Primary Examiner* — Daniel L Murphy
(74) *Attorney, Agent, or Firm* — Holland & Hart LLP (57) ABSTRACT

A system for detecting plastics, macro-plastics, micro-plastics and nano-plastics in a maritime, estuary or river environment includes multiple detection devices and a data processing device. The detection devices detect the plastics, macro-plastics, micro-plastics, and nano-plastics using different detection wavelengths. The data processing device includes a communication interface and a processor. The communication interface receives detection signals from the detection devices and the processor determines locations of the plastics, the macro-plastics, the micro-plastics and the nano-plastics in the environment based at least in part on the received detection signals within a common coordinate system.

32 Claims, 10 Drawing Sheets (51) Int. Cl.
*G01S 19/14* (2010.01)
*G06N 20/00* (2019.01)

(56) References Cited

OTHER PUBLICATIONS

Translation of abstract of CN111474142 Xiao et al, 2020, created Feb. 7, 2025, 1 page. (Year: 2020).*

\* cited by examiner

SYSTEM FOR DETECTING PLASTICS, MACRO-PLASTICS, MICRO-PLASTICS, AND NANO-PLASTICS IN A MARITIME, ESTUATRY, OR RIVER ENVIRONMENT

TECHNICAL FIELD

The present disclosure relates to the field of detection and classification of floating plastics, macro-plastics, micro-plastics and nano-plastics in water.

BACKGROUND

Increasing quantities of plastics, macro-plastics, micro-plastics and nano-plastics floating or dispensed within water, such as in maritime, estuary or river environments, pose an increasing challenge for the environment.

The detection and classification of these different plastics is of particular relevance for facilitating clean-up operations in the environment. However, common techniques allow only for a coarse detection and classifications of these different plastics.

SUMMARY

It is an object of the present disclosure to provide a concept for detecting plastics, macro-plastics, micro-plastics and nano-plastics in a maritime, estuary or river environment.

This object is achieved by the features of the independent claims. Further implementation forms are apparent from the dependent claims, the description and the figures.

The principles of the present disclosure are based on the finding that different detection wavelengths may be used for detecting the plastics, the macro-plastics, the micro-plastics and the nano-plastics in the maritime, estuary or river environment. Due to different characteristics of plastics, macro-plastics, micro-plastics and nano-plastics at different detection wavelengths, a detection and/or classification of the different plastics may be achieved with increased accuracy.

The nano-plastics may be formed by very small fibers, the micro-plastics may be formed by small fibers, and the macro-plastics may be formed by larger plastic objects. The macro-plastics, the micro-plastics, and the nano-plastics may be dispensed within the water. The plastics may refer to larger plastic objects, and may float on the water.

According to a first aspect, the present disclosure relates to a system for detecting plastics, macro-plastics, micro-plastics and nano-plastics in a maritime, estuary or river environment. The system comprises a plurality of detection devices for detecting the plastics, the macro-plastics, the micro-plastics and the nano-plastics in the environment, the detection devices being configured for detection using different detection wavelengths. The system further comprises a data processing device, comprising a communication interface and a processor. The communication interface is configured to receive detection signals from the plurality of detection devices. The processor is configured to determine locations of the plastics, the macro-plastics, the micro-plastics and the nano-plastics in the environment on the basis of the received detection signals within a common coordinate system.

In an example of the system, the different detection wavelengths are used for evaluating elastic and/or non-elastic scattering of visible and/or invisible light, wherein the processor is configured to perform at least one data processing method, in particular a real time processing method and/or an artificial intelligence processing method, and wherein the plurality of detection devices comprise micro-integrated electronics, laser diodes, fiber-optics for light piping and/or a distributed components layout.

In an example of the system, the system is configured to provide information on plastics, macro-plastics, micro-plastics and nano-plastics spatial distribution within the environment using spatial mapping through the use of scanning and/or spatial measurements and/or temporal measurements with in-situ observation feeds into circulation models, and wherein the processor is configured to validate satellite observations.

In an example of the system, the system is configured to use as one of the plurality of detection devices, a multispectral laser/light detection and ranging device (LADAR or LIDAR) for selective plastic detection and plastic type classification.

In an example of the system, the system is configured to use multiple simultaneous and/or sequential wavelengths for optimum detection and classification, in particular a blue-green laser beam for micro-plastics detection, a green laser beam for macro-plastics detection and/or a red laser beam for the detection of plastics or objects.

In an example of the system, the system is configured to use a UV beam for nano-plastic and/or organic substance detection, wherein the system is configured to evaluate elastic scattering to provide specific signatures of substances, in particular evaluating fluorescence to detect and discriminate against organic material.

In an example of the system, at least one of the plurality of detection devices is configured to generate a multispectral Laser/Light beam to penetrate a water surface within the environment and to obtain a high sensitivity 2D image and/or a high-resolution 3D image.

In an example of the system, the processor is configured to provide information on plastics, macro-plastics, micro-plastics and nano-plastics spatial hotspots using the detection signals from the plurality of detection devices to provide accurate local measurements.

In an example of the system, the processor is configured to provide quantitative information, in particular mass per volume and/or plastics size distribution information, on the plastics, the macro-plastics, the micro-plastics and the nano-plastics on the basis of the received detection signals.

In an example of the system, the processor is configured to use a classification method implemented to provide classification of plastics, macro-plastics, micro-plastics and nano-plastics types using multiplexed colors, in particular in the range of UV through visible, to infrared, the use of spectroscopy and/or the use of fluorescence for detection and classification within the environment.

In an example of the system, the processor is configured to use the received detection signals in conjunction with an integrated GPS position signal, an attitude control signal, and/or a laser range finding signal, to provide geo-location information of the plastics, the macro-plastics, the micro-plastics and the nano-plastics in the environment.

In an example of the system, the processor is configured to provide an indication of a vertical distribution of the plastics, the macro-plastics, the micro-plastics and the nano-plastics in the environment, wherein at least one of the plurality of detection devices is configured to use wavelengths that penetrate a water column by using multiplexed colors, in particular in the range of UV through visible, to infrared.

In an example of the system, the processor is configured to identify specific plastics, macro-plastics, micro-plastics and nano-plastics chemical composition and/or size distribution using multiplexed colors, in particular in the range of UV through visible, to infrared, the use of spectroscopy, the use of fluorescence, the use of collimated laser light to 1 mrad and/or the use of high range resolution to millimeter and centimeter scale.

In an example of the system, the processor is configured to detect and classify nano-plastics, including plastics broken down to particles smaller than 1 micrometer, wherein at least one of the plurality of detection devices is configured to use a light with wavelengths smaller than 1 micrometer, in particular 300 nm, which enables interaction with extremely small particles through Rayleigh scattering and/or other optical effects such as fluorescence and Raman scattering.

In an example of the system, the processor is configured to detect and classify micro-plastics and to work with plastics with particle sizes in the micrometer to millimeter range, wherein at least one of the plurality of detection devices is configured to use a micrometer scale light that provides detection of plastics by spatial resonance and/or by semi-specular reflection.

In an example of the system, the processor is configured to detect and classify macro-plastics and work with plastics with sizes larger than millimeter to large plastic objects, wherein at least one of the plurality of detection devices is configured to use specular reflection and diffusing of the scattering of light from the identified macro-plastics.

In an example of the system, the processor is configured to discriminate between plastics and natural phenomena, in particular waves, natural algae, fish and organisms, natural occurring hydrocarbons and oil, and/or air bubbles, wherein the system is operable in different sea states and natural waters, wherein the processor is configured to isolate reflections from a water surface using high performance codes having low sidelobes and/or a high spatial precision, in particular to 10 cm, allowing operation of the system.

In an example of the system, the processor is configured to use additional data from camera sensors, radars or high resolution radars, acoustical sensors or sonars, other data provided by signal processing and object detection from optical sensors, along with data fusion with data from a laser/light detection and ranging (LADAR or LIDAR) device.

In an example of the system, the communication interface is configured to receive data in-situ from chemical sensors, wherein the processor is configured to use geolocation-based processing.

In an example of the system, the processor is configured to operate with and receive input from ocean current models, waves models and/or wind models, in particular meta-ocean models, by fusing laser/light detection and ranging (LADAR or LIDAR) device data measurement at several locations and several time locations with historic/nowcast/forecast models, for allowing plastic's precise location detection after a period of time.

In an example of the system, the system is operable in a configuration that can be used, mounted and/or located on variety of platforms, vessels, sub-merged vessels, aircrafts, drones, and autonomous vessels/aircrafts, amongst others, using its modular and flexible construction, by being small and compact in size, with its electronics being of small size, low power consumption, light is fed by flexible fiber optics to apertures in fuselage and the configurations to use its included GPS (surface, aircraft) and Inertial Navigation System (INS) and a laser beam at 1 milliradian or more according to a user's configurations.

In an example of the system, the system is operable in a configuration that can investigate specific areas in the environment to provide detailed data and can be located on stationary/hovering platforms which can increase resolution and sensitivity by use of adaptive processing and supported by precise navigation tools, in particular GPS when a LADAR is above water, or another precise navigation system when a LADAR is under water.

In an example of the system, the system is operable in a configuration that allows a large scale of deployment to cover great sizes of area for detecting the plastics, the macro-plastics, the micro-plastics and the nano-plastics in the environment, in particular due to its inexpensive components and production methods, software based design, remote software control and/or open interfaces.

In an example of the system, the system is operable in a configuration that is configured to sample large expanses of sea as it can operate from large altitudes to cover large areas and can also be mounted on fast vessels or aircrafts with instantaneous measurements and sample in trajectories and can have side-scanning to generate data over a wide swath.

In an example of the system, the system is operable in a configuration wherein a LADAR/LIDAR sensor is supplemented with other sensors, and wherein the sensors form one kit/black box that is able to monitor a footprint (physical size) of a certain geographical area, and wherein the footprint (physical size) can be expanded by scanning around the sensors for 360 degrees, and the footprint may sweep around in a circle and scan that specific geographical area.

In an example of the system, the system is operable in a configuration wherein there are more kits/black boxes that have a similar footprint, such that a plurality of scanning units can be aligned in a line or a grid, connected with fiber optics to a communication network, and each of the units is configured either to scan in a dedicated footprint or each of the units is configured to scan in circles around the respective sensor, for covering a greater area of scanning when more scanning units are used.

In an example of the system, the system is operable in a configuration wherein a black box/kit with a sensor, either on a fixed point, in particular a buoy or a platform, or on a vehicle that is on the move, in particular a vessel, is linked with a drift model, so as to determine the trajectories of the plastic over the course of days, weeks and/or months, while taking into account factors of wind fetch, wave interaction and/or ocean currents, and to determine where the plastic's final geographical location will be over the period of time.

In an example of the system, the system is configured to operate irresectable of atmospheric and/or sea-state conditions, in particular fog, rain, ice, snow, sun glitters, and/or sunshine, by using high performance coding of a laser waveform with large entropy, in particular Golay codes.

In an example of the system, the system is configured to be self-learning by automatic and manual feedback to provide accurate information and can include Artificial Intelligence (AI) methods for self-learning and self-optimization such as when an object is identified and verified using correlation techniques to patterns, geo-structural information, chemical information amongst others, wherein this information can be integrated in the self-learning algorithm and used with the return signals for plastic detection and identification.

In an example of the system, the system is modular and configurable to adapt to user needs, in particular having installations where electronics and sensors are arranged at different locations, separated by fiber up to 500 m for short distances and up to several kilometers for long distances, mechanical implementation, micro-electronics, fiber optics, cost related to the system, software based design, remote software control, and/or open interfaces.

In an example of the system, the system is safe for the eyes of the user and the people in its proximity and provides safety from high illuminative optical power, making it safe to use in different conditions with programmable laser power, controlled laser beam divergence, day and night operating modes, and/or a selectable wavelength which includes an eye safety wavelength.

According to a second aspect, the present disclosure relates to a method for operating a system for detecting plastics, macro-plastics, micro-plastics and nano-plastics in a maritime, estuary or river environment. The system comprises a plurality of detection devices and a data processing device comprising a communication interface and a processor. The detection devices are configured for detection using different detection wavelengths. The method comprises detecting, by the plurality of detection devices, the plastics, the macro-plastics, the micro-plastics and the nano-plastics in the environment, receiving, by the communication interface, detection signals from the plurality of detection devices, and determining, by the processor, locations of the plastics, the macro-plastics, the micro-plastics and the nano-plastics in the environment upon the basis of the received detection signals within a common coordinate system.

The method can be performed by the system. Further features of the method directly result from the features and/or the functionality of the system.

According to a third aspect, the present disclosure relates to a computer program for performing the method when executed by a system, in particular to provide relevant information, including location, characterization and identification of the plastics detected.

BRIEF DESCRIPTION OF THE DRAWINGS

Further examples of the principles of the present disclosure will be described with respect to the following figures, in which.

DETAILED DESCRIPTION

In the following description, reference is made to the accompanying figures, which form part of the present disclosure, and which show, by way of illustration, specific aspects of examples of the principles of the present disclosure or specific aspects in which examples of the principles of the present disclosure may be used. It is understood that examples of the principles of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding system configured to perform the method and vice versa. For example, if one or a plurality of specific method steps are described, a corresponding system may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific system is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various illustrative examples and/or aspects described herein may be combined with each other, unless specifically noted otherwise.

Figure 1:
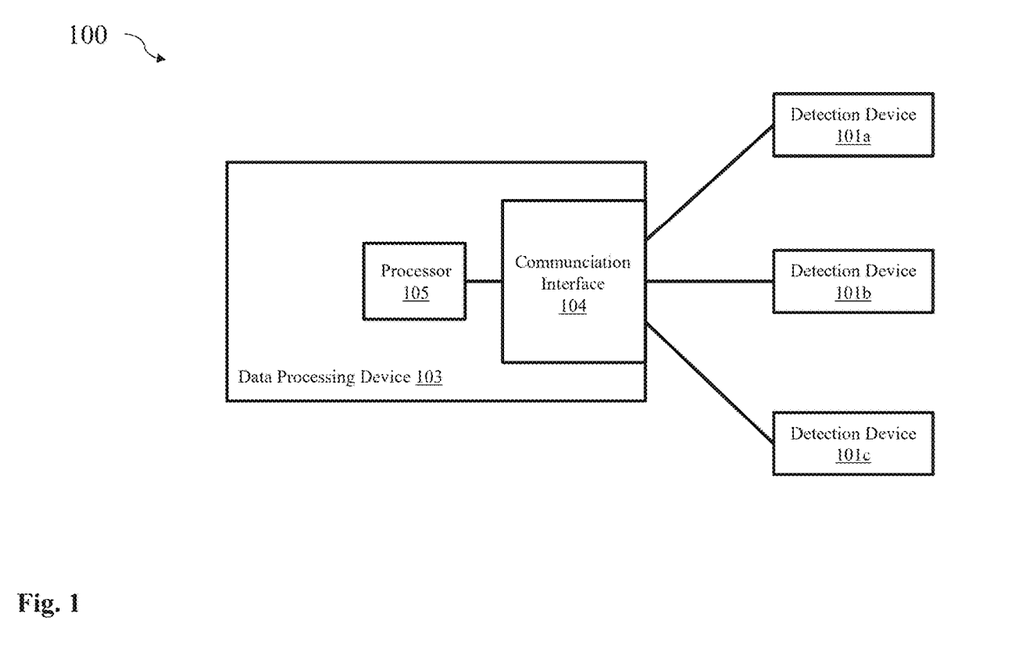
FIG. 1 shows a schematic diagram of a system for detecting plastics, macro-plastics, micro-plastics and nano-plastics in a maritime, estuary or river environment.

FIG. 1 shows a schematic diagram of a system 100 for detecting plastics, macro-plastics, micro-plastics and nano-plastics in a maritime, estuary or river environment.

The system 100 comprises a plurality of detection devices 101a, 101b, 101c for detecting the plastics, the macro-plastics, the micro-plastics and the nano-plastics in the environment, the detection devices 101a, 101b, 101c being configured for detection using different detection wavelengths. The system 100 further comprises a data processing device 103, comprising a communication interface 104 and a processor 105. The communication interface 104 is configured to receive detection signals from the plurality of detection devices 101a, 101b, 101c. The processor 105 is configured to determine locations of the plastics, the macro-plastics, the micro-plastics and the nano-plastics in the environment on the basis of the received detection signals within a common coordinate system.

Figure 2:
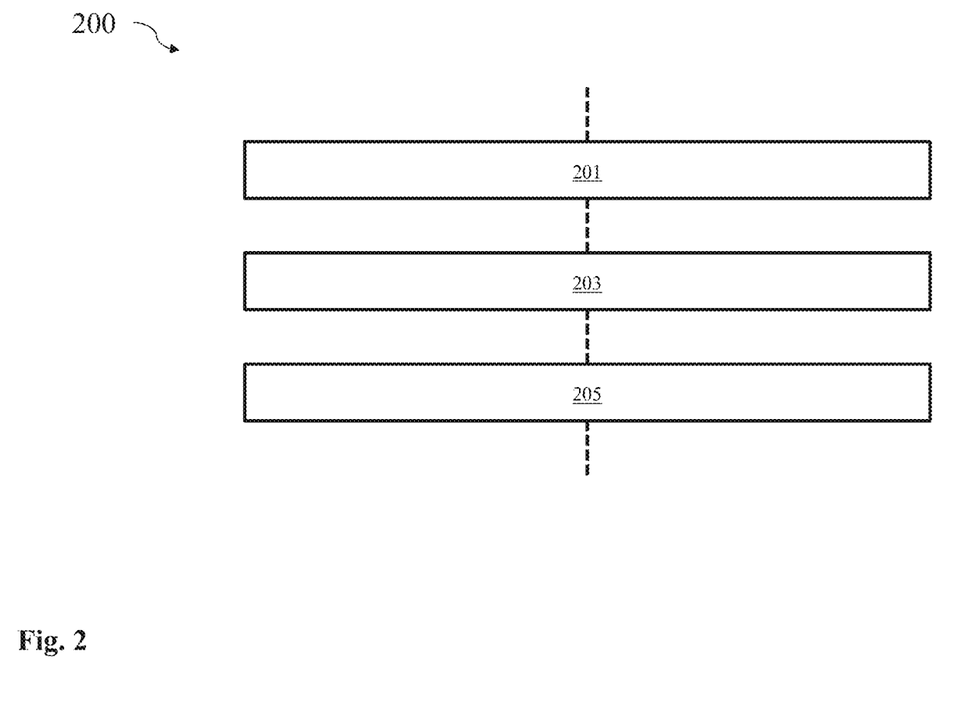
FIG. 2 shows a schematic diagram of a method for operating a system for detecting plastics, macro-plastics, micro-plastics and nano-plastics in a maritime, estuary or river environment.

FIG. 2 shows a schematic diagram of a method 200 for operating a system for detecting plastics, macro-plastics, micro-plastics and nano-plastics in a maritime, estuary or river environment. The system comprises a plurality of detection devices and a data processing device comprising a communication interface and a processor. The detection devices are configured for detection using different detection wavelengths.

The method 200 comprises detecting 201, by the plurality of detection devices, the plastics, the macro-plastics, the micro-plastics and the nano-plastics in the environment, receiving 203, by the communication interface, detection signals from the plurality of detection devices, and determining 205, by the processor, locations of the plastics, the macro-plastics, the micro-plastics and the nano-plastics in the environment on the basis of the received detection signals within a common coordinate system.

Figure 3:
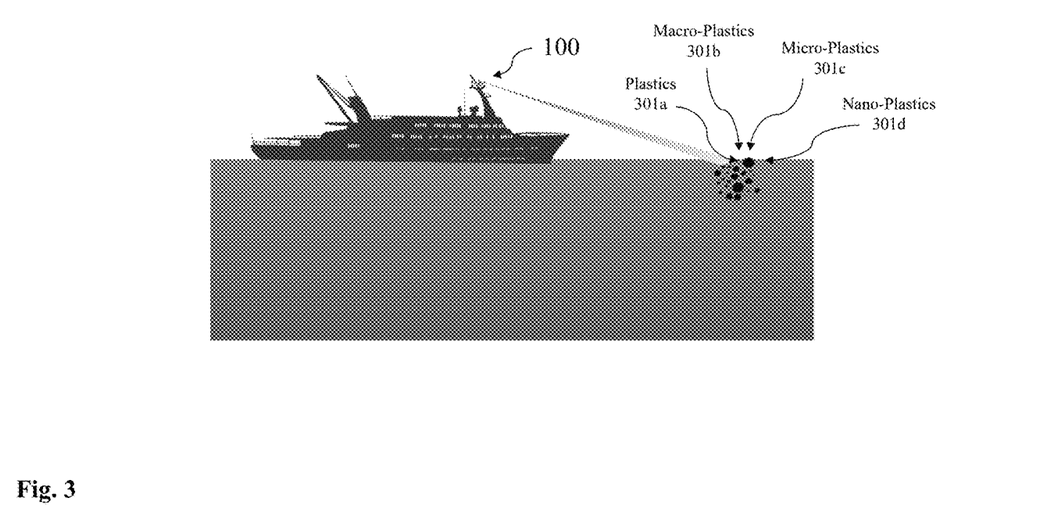
FIG. 3 shows a schematic diagram of a maritime vessel comprising a system for detecting plastics, macro-plastics, micro-plastics, and nano-plastics in a maritime, estuary or river environment.

FIG. 3 shows a schematic diagram of a maritime vessel comprising a system 100 for detecting plastics 301a, macro-plastics 301b, micro-plastics 301c, and nano-plastics 301d in a maritime, estuary or river environment.

Exemplarily, the system 100 is mounted on a mast of the maritime vessel. In general, however, the system 100 may be arranged on a wide variety of platforms, e.g., any maritime vessel, submarine, offshore platform, pier, aquaculture tank, and the like. In other words, the system 100 may be mounted on any surface vessel or coastal infrastructure.

In this example, a LADAR may be used as a detection device. The in-situ LADAR may measure basic plastic types and quantities. The LADAR in-situ observations may be fed into circulation models and may be used to validate satellite observations.

As a result, an enhanced knowledge of the origin of the plastics 301a, the macro-plastics 301b, the micro-plastics 301c, and the nano-plastics 301d may be provided. Furthermore, knowledge of the location and the type of plastic may facilitate cost-efficient clean-up operations in the environment.

Figures 4A, 4B:
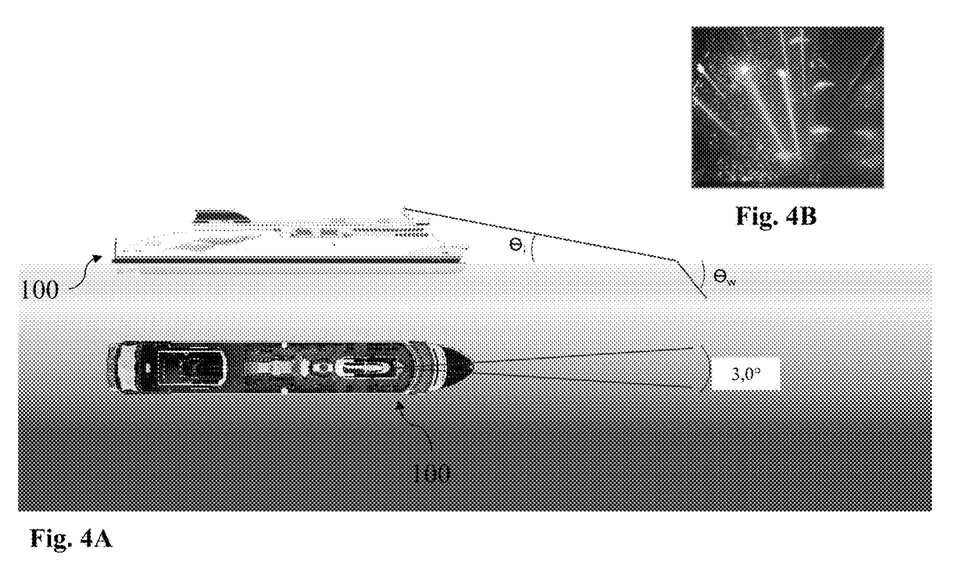
FIG. 4A shows a schematic diagram of a maritime vessel comprising a system for detecting plastics, macro-plastics, micro-plastics, and nano-plastics in a maritime, estuary or river environment.
FIG. 4B depicts plastics, the macro-plastics, the micro-plastics, and the nano-plastics in a maritime, estuary or river environment.

FIG. 4A shows a schematic diagram of a maritime vessel comprising a system 100 for detecting plastics, macro-plastics, micro-plastics, and nano-plastics in a maritime, estuary or river environment. FIG. 4B depicts plastics, the macro-plastics, the micro-plastics, and the nano-plastics in a maritime, estuary or river environment.

In this example, a LADAR may be used as a detection device. The laser beam is transmitted towards the water surface at an angle θi and is refracted into the water at an angle θw. The azimuthal width of the laser beam may, e.g., be 3.0°.

The laser beam comprises a plurality of different wavelengths, which may be generated simultaneously or sequentially for detecting the plastics, the macro-plastics, the micro-plastics, and the nano-plastics. The laser beam interacts with the plastics, the macro-plastics, the micro-plastics, and the nano-plastics in the water.

The plurality of different wavelength may be used for detecting the plastics, the macro-plastics, the micro-plastics, and the nano-plastics.

Figure 5:
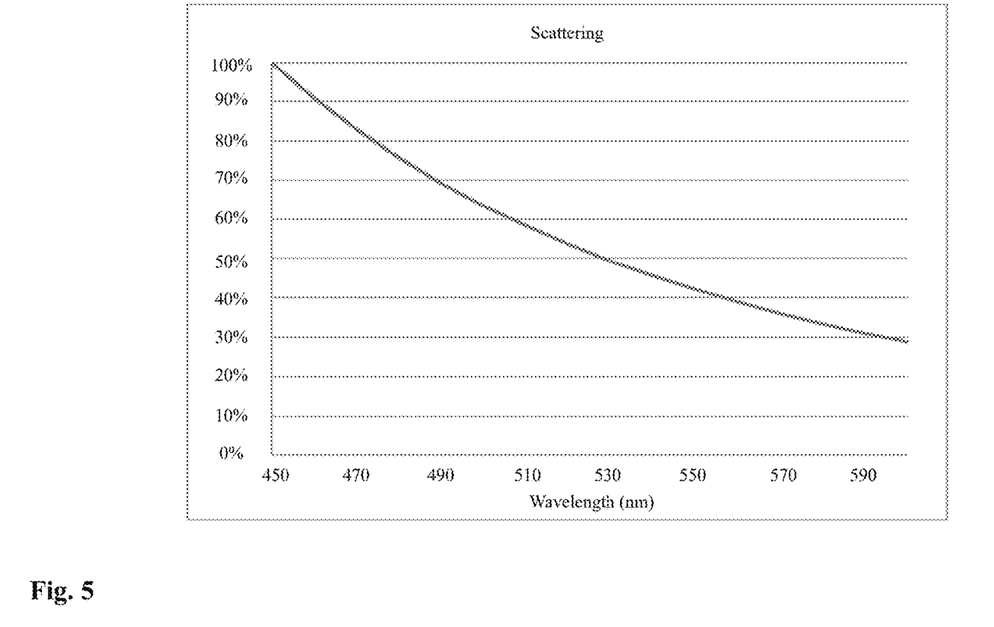
FIG. 5 shows a schematic diagram illustrating the scattering within water in dependence of wavelength.

FIG. 5 shows a schematic diagram illustrating the scattering within water in dependence of wavelength. As can be seen, the scattering decreases with increasing wavelength.

Figure 6:
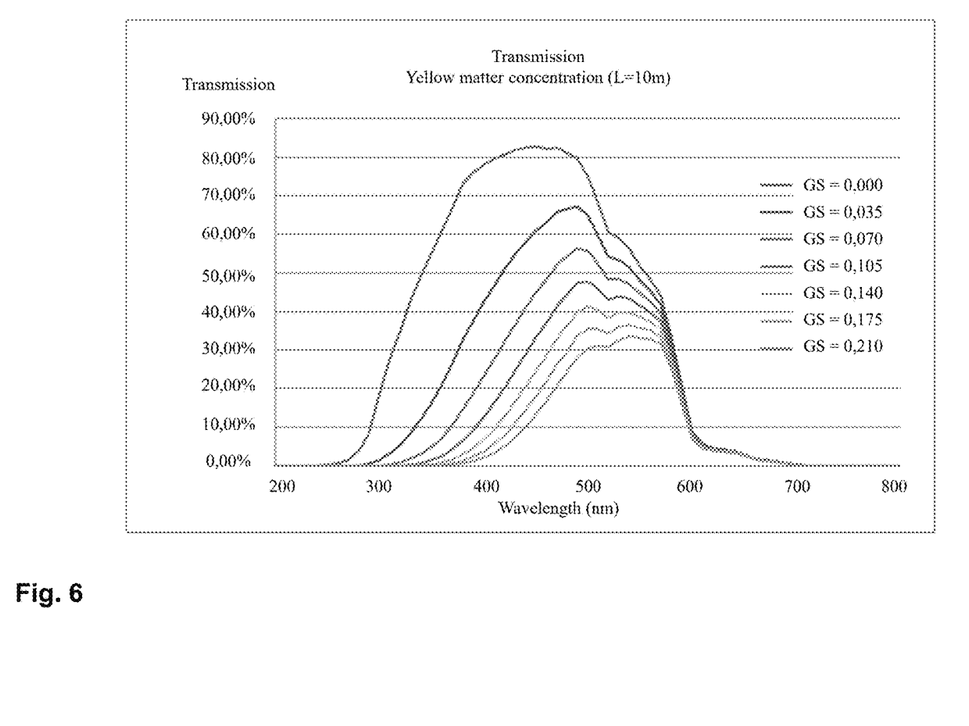
FIG. 6 shows a schematic diagram illustrating the transmission within water in dependence of wavelength.

FIG. 6 shows a schematic diagram illustrating the transmission within water in dependence of wavelength. As can be seen, the transmission varies with wavelength. Exemplary coefficients are given as follows: GS=0 for clean sea water, GS=0.07 for north sea water, and GS=0.24 for Baltic sea water, where GS describes a concentration of yellow matter within water.

Figure 7:
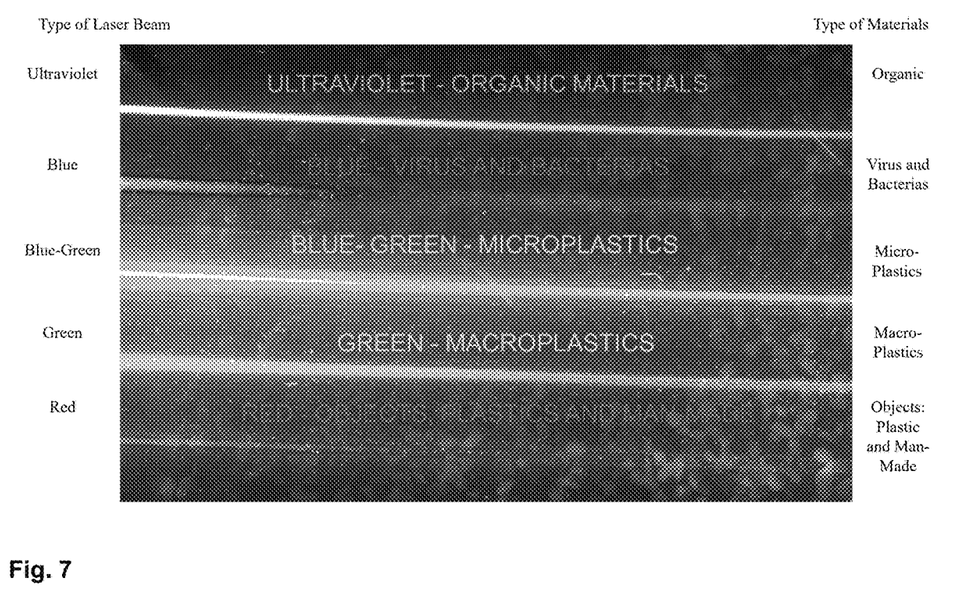
FIG. 7 shows a schematic diagram of different laser beams having different wavelengths.

FIG. 7 shows a schematic diagram of different laser beams having different wavelengths. An ultraviolet laser beam may be suitable to detect organic materials; a blue laser beam may be suitable to detect viruses and bacteria; a blue-green laser beam may be suitable to detect micro-plastics; a green laser beam may be suitable to detect macro-plastics; and a red laser beam may be suitable to detect further objects, plastics and other man-made material.

The system may provide a multi-spectral LADAR for the selective detection of the plastics.

The multi-spectral LADAR may be realized using different single-spectral LADAR s as different detection devices. However, the multi-spectral LADAR may also be realized within a single detection device.

Laser/Light for detection may particularly be suitable since it penetrates water, and reflects from the plastics, the macro-plastics, the micro-plastics, and the nano-plastics. The penetration may amount to depths of, e.g., 1 to 10 meters.

The nano-plastics may be formed by very small fibers, the micro-plastics may be formed by small fibers, and the macro-plastics may be formed by larger plastic objects. The macro-plastics, the micro-plastics, and the nano-plastics may be dispensed within the water. The plastics may refer to larger plastic objects, and may float on the water.

Figure 8:
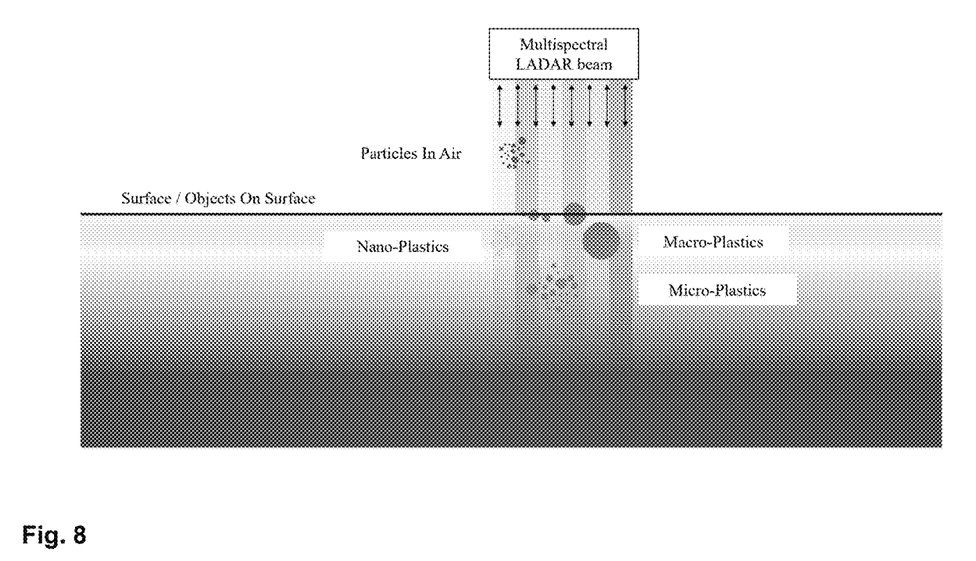
FIG. 8 shows a schematic diagram of a multi-spectral laser beam.

FIG. 8 shows a schematic diagram of a multi-spectral laser beam. The multi-spectral laser beam comprises a plurality of different wavelengths for detecting the macro-plastics, the micro-plastics, and the nano-plastics dispensed within the water. The system may be capable of mitigating the effect of particles dispensed in the air. The system may perform a selective detection process.

Figure 9:
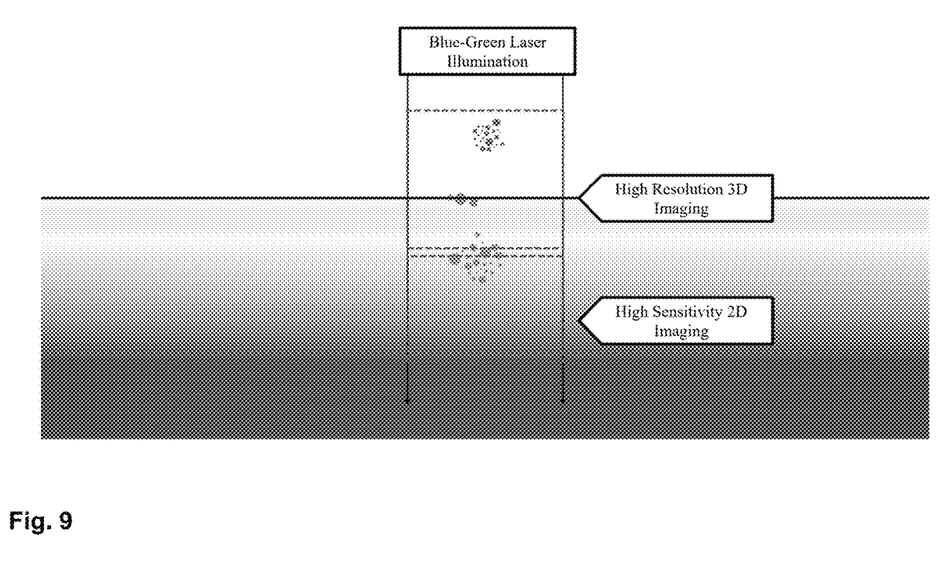
FIG. 9 shows a schematic diagram of a blue-green laser beam.

FIG. 9 shows a schematic diagram of a blue-green laser beam. The illumination of the water by the blue-green laser beam may allow for providing a high resolution 3D imaging and/or a high sensitivity 2D imaging for detecting plastics, macro-plastics, micro-plastics and nano-plastics on or below the water surface.

Figure 10:
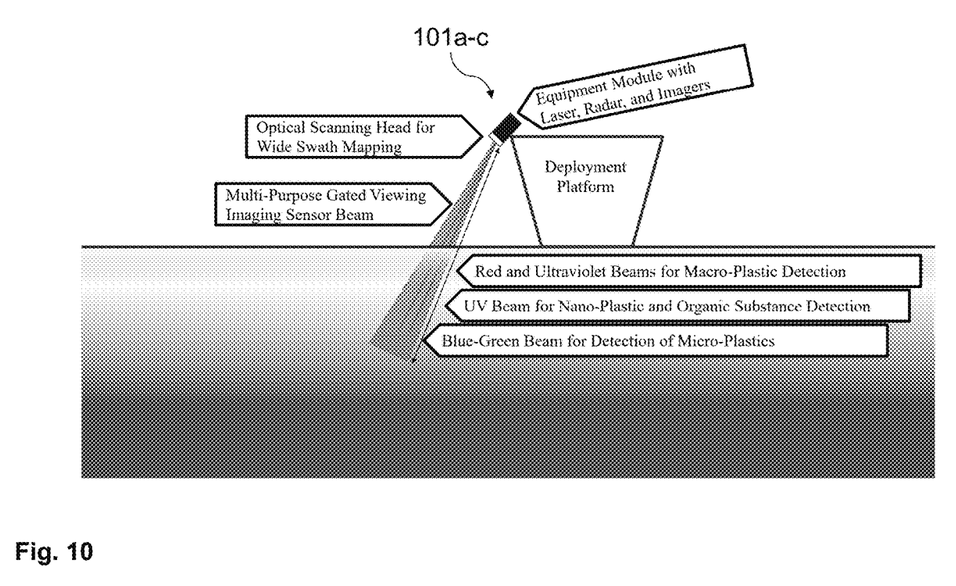
FIG. 10 shows a schematic diagram of a plurality of detection devices.

FIG. 10 shows a schematic diagram of a plurality of detection devices 101a, 101b, 101c. The detection devices 101a, 101b, 101c may be arranged within an equipment module. The detection devices 101a, 101b, 101c may, e.g., be realized as a LADAR, Radar and Imager.

The plurality of detection devices 101a, 101b, 101c may be equipped with a scanning head, in particular an optical scanning head, for wide swath mapping. The plurality of detection devices 101a, 101b, 101c may provide a multi-purpose gated viewing imaging sensor beam.

Red and ultraviolet laser beams may be used for macro-plastic detection; UV laser beams may be used for nano-plastics and organic substance detection; and blue-green laser beams may be used for detection of micro-plastics.

The system may be used for a plurality of applications and purposes. The system may, e.g., be used for facilitating clean-up operations in the environment. Furthermore, the system may be used in military applications for detection of submarines/divers/floating mines; in fishery applications for pelagic fish mapping and water turbidity determination; in safety applications for collision avoidance; in security applications for surveillance below and above the water surface; and in charting applications for sea floor mapping/bathymetry. The system may be deployed in multi-purpose applications, and may provide a cost-effective solution for detection, classification and mapping within maritime, estuary or river environments.

Further examples of the system are defined as follows:

In an example, the system can provide information on plastics spatial distribution. This may be achieved by spatial mapping through the use scanning and spatial/temporal measurement.

In an example, the system can provide information on plastics hotspots. This may be achieved by accurate local measurements.

In an example, the system can provide quantitative information on plastics. This may be achieved by classification methods.

In an example, the system can be used on a variety of platforms. This may be achieved by a modular and flexible construction, and/or the use of microelectronics, small laser diodes, use of fiber optics for light piping, and a sensor head separable from the electronics.

In an example, the system can provide precise geolocation of plastics in the ocean. This may be achieved by using GPS, attitude control, and/or laser range finding.

In an example, the system can provide indication of vertical distribution of plastics. This may be achieved by using of wavelengths that penetrate the water column, and/or multiplexed colors, in the range of UV through visible, to infrared.

In an example, the system can provide a classification of plastics types. This may be achieved by using multiplexed colors, in the range of UV through visible, to infrared, by using spectroscopy, and/or using fluorescence.

In an example, the system can identify specific plastics. This may be achieved by deciding on chemical composition and size distribution, and/or by using multiplexed colors, in the range of UV through visible, to infrared, by using spectroscopy, by using fluorescence, by using collimated laser light to 1 mrad, and/or by using of high range resolution to 10 cm.

In an example, the system can detect and classify nano plastics. To work with plastics broken down to particles smaller than 1 micrometer, this may be achieved by using light with wavelengths smaller than 1 micrometer, e.g., 300 nm, enabling an interaction with extremely small particles through Rayleigh scattering. Also other optical effects such as fluorescence and Raman scattering may be considered.

In an example, the system can detect and classify microplastics. To work with plastics with particle sizes micrometer to millimeter, this may be achieved by using micrometer scale light providing detection of plastics by spatial resonance and by semi specular reflection.

In an example, the system can detect and classify macroplastics. To work with plastics with sizes larger than millimeter to large plastic objects, this may be achieved by detecting objects by specular reflection and by diffuse scattering of light from objects.

In an example, the system can discriminate between plastics and natural phenomena and can operate in natural waters. This may be achieved by using multiplexed colors, in the range of UV through visible, to infrared, by using spectroscopy, by using fluorescence, by using of collimated laser light to 1 mrad, and/or by using high range resolution to 10 cm.

In an example, the system can operate irrespective of fog, rain and sunshine. This may be achieved by using high performance coding of the laser waveform with large entropy, e.g., using Golay codes.

In an example, the system can operate in different sea states and/or can isolate reflection from the sea surface. This may be achieved by using high performance codes which also have low sidelobes, and/or high spatial precision, e.g., to 10 cm.

In an example, the system can use additional data from camera sensors and/or use signal processing and/or object detection from optical sensors, in conjunction with data fusion with data from a LADAR.

In an example, the system can use additional data from radar sensors and/or use signal processing and/or object detection from radar sensors, in conjunction with data fusion with data from a LADAR.

In an example, the system can use additional data from acoustical sensors and/or use signal processing and/or object detection from acoustical sensors or sonars, in conjunction with data fusion with data from a LADAR.

In an example, the system can use additional data from chemical sensors, e.g., in-situ. A geolocation based processing may be used.

In an example, the system can work with ocean current models. This may be achieved by fusing LADAR data measurements at several locations and several time locations with historic/NOWcast/FORECAST ocean and current models.

In an example, the system is self-learning. The system may learn by automatic and/or manual feedback to provide accurate information. The system may use AI (Artificial Intelligence) methods for self-learning and/or self-optimization.

In an example, the system can be installed on a maritime vessel, e.g., a ship.

In an example, the system can be installed on a submerged vessel. This may be achieved because electronics may have small size, low power consumption, and/or light being fed by flexible fiber optics to apertures in fuselage.

In an example, the system can be used on an aircraft. This may be achieved because electronics may have small size, low power consumption, and/or light being fed by flexible fiber optics to apertures in fuselage.

In an example, the system can be used on an autonomous vessels/aircraft. The system may have included a GPS (surface, aircraft) and an INS (Inertial Navigation System), and/or may use a precise laser beam at 1 milliradian.

In an example, the system can sample large expanses of sea. The system can operate on fast ship or aircraft, may provide instantaneous measurements, can sample in trajectories, can have side-scanning to generate data over wide swaths, and/or can operate from large altitudes to cover large areas.

In an example, the system can investigate specific areas to give detailed data. The system can operate from stationary/hovering platforms, can increase resolution and sensitivity by use of adaptive processing, and/or can be supported by precise navigation tools.

In an example, the system is modular and configurable to adapt to user needs. This may be achieved by using installations where electronics and sensor heads are at different locations, separated by fiber, e.g., by up to 500 m, suitable mechanical implementation, usage of microelectronics, fiber optics, low cost components, software based design, remote software control, and/or open interfaces.

In an example, the system is small and compact. This may allow the system to be used on even very small platforms, down to small UAVs and drones. This may be achieved by suitable mechanical implementation, usage of microelectronics, fiber optics, low cost components, software based design, remote software control, and/or open interfaces.

In an example, the system is inexpensive to facilitate large scale deployment. This may be achieved by suitable mechanical implementation, usage of microelectronics, fiber optics, low cost components, software based design, remote software control, and/or open interfaces.

In an example, the system is eye safe to facilitate use in specific platforms. This may be achieved using a programmable laser power, a controlled laser beam divergence, day and night operating modes, and/or selectable wavelengths including eye safe wavelengths.

In several examples provided in the present application, it should be understood that the disclosed system and method may be implemented in other manners. For example, the described system implementation is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented e.g., in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the examples.

In addition, functional units in the examples of the present disclosure may be integrated into one single unit, or each of the units may exist alone physically, or two or more units are integrated into one single unit.

REFERENCE NUMBERS

100 System
101a Detection device
101b Detection device
101c Detection device
103 Data processing device
104 Communication interface
105 Processor
200 Method
201 Detecting
203 Receiving
205 Determining
301a Plastics
301b Macro-plastics
301c Micro-plastics
301d Nano-plastics

The invention claimed is:

1. A system for detecting plastics, macro-plastics, micro-plastics and nano-plastics in a maritime, estuary or river environment, the system comprising:
a plurality of detection devices configured to detect the plastics, the macro-plastics, the micro-plastics and the nano-plastics in the environment, the detection devices being configured for detection using different detection wavelengths, wherein the plurality of detection devices comprises one or more of: micro-integrated electronics, laser diodes, fiber-optics for light piping or a distributed components layout; and
a data processing device comprising a communication interface and a processor, wherein the communication interface is configured to receive detection signals from the plurality of detection devices, and wherein the processor is configured to determine locations of the plastics, the macro-plastics, the micro-plastics and the nano-plastics in the environment based at least in part on the received detection signals within a common coordinate system.

2. The system of claim 1, wherein the different detection wavelengths are associated with evaluating elastic or non-elastic scattering of visible or invisible light, wherein the processor is configured to perform at least one real-time data processing method or an artificial intelligence processing method.

3. The system of claim 1, wherein the system is configured to provide information on plastics, macro-plastics, micro-plastics and nano-plastics spatial distribution within the environment using spatial mapping via one or more of: scanning measurements, spatial measurements, or temporal measurements;
wherein the processor is further configured to feed in-situ observations from the plurality of detection devices into one or more circulation models, and to validate satellite observations.

4. The system claim 1, wherein the system is configured to use as one of the plurality of detection devices, a multispectral laser/light detection and ranging device (LADAR or LIDAR) for selective plastic detection and plastic type classification.

5. The system of claim 1, wherein the system is configured to use a plurality of simultaneous or sequential wavelengths for detection and classification of the plastics, the macro-plastics, the micro-plastics, or the nano-plastics; wherein a blue-green laser beam is used for micro-plastics detection, a green laser beam is used for macro-plastics detection, and a red laser beam is used for detection of plastics or objects.

6. The system of claim 1, wherein the system is configured to use a UV beam for nano-plastic and/or organic substance detection, wherein the system is further configured to evaluate fluorescence to detect and discriminate against organic material.

7. The system of claim 1, wherein at least one of the plurality of detection devices is configured to generate a multispectral Laser/Light beam to penetrate a water surface within the environment and to obtain a two dimensional image or a high-resolution image.

8. The system of claim 1, wherein the processor is configured to provide information on spatial hotspots of plastics, macro-plastics, micro-plastics or nano-plastics using the detection signals from the plurality of detection devices.

9. The system of claim 1, wherein the processor is configured to provide mass per volume information or plastics size distribution information for the plastics, the macro-plastics, the micro-plastics or the nano-plastics based at least in part on the received detection signals.

10. The system of claim 1, wherein the processor is configured to use a classification method implemented to provide classification of plastics, macro-plastics, micro-plastics and nano-plastics types using one or more of: multiplexed colors in a range of UV through visible to infrared, spectroscopy, or fluorescence for detection and classification within the environment.

11. The system of claim 1, wherein the processor is configured to use the received detection signals in conjunction with one or more of an integrated GPS position signal, an attitude control signal, or a laser range finding signal, to provide geo-location information of the plastics, the macro-plastics, the micro-plastics and the nano-plastics in the environment.

12. The system of claim 1, wherein the processor is configured to provide an indication of a vertical distribution of the plastics, the macro-plastics, the micro-plastics and the nano-plastics in the environment, wherein at least one of the plurality of detection devices is configured to use wavelengths that penetrate a water column by using multiplexed colors in a range of UV through visible to infrared.

13. The system of claim 1, wherein the processor is configured to identify a chemical compositions or size distribution of the plastics, macro-plastics, micro-plastics and nano-plastics chemical composition using one or more of: multiplexed colors in a range of UV through visible to infrared, spectroscopy, fluorescence, collimated laser light to 1 mrad, or a high range resolution to millimeter and centimeter scale.

14. The system of claim 1, wherein the processor is configured to detect and classify nano-plastics, including plastics broken down to particles smaller than 1 micrometer, wherein at least one of the plurality of detection devices is configured to use a light with wavelengths smaller than 1 micrometer, in particular 300 nm, which enables interaction with nano-plastics particles through Rayleigh scattering and one or more of: fluorescence or Raman scattering.

15. The system of claim 1, wherein the processor is configured to detect and classify micro-plastics and to work with plastics with particle sizes in the micrometer to millimeter range, wherein at least one of the plurality of detection devices is configured to use a micrometer scale light that provides detection of plastics by spatial resonance or by semi-specular reflection.

16. The system of claim 1, wherein the processor is configured to detect and classify macro-plastics and work with plastics with sizes larger than millimeter to large plastic objects, wherein at least one of the plurality of detection devices is configured to use specular reflection and diffusing of the scattering of light from the macro-plastics.

17. The system of claim 1, wherein the processor is configured to discriminate between plastics and natural phenomena, the natural phenomena including waves, natural algae, fish and organisms, natural occurring hydrocarbons and oil, or air bubbles, wherein the system is operable in different sea states and natural waters, wherein the processor is configured to isolate reflections from a water surface using codes having low sidelobes or a spatial precision to 10 cm.

18. The system of claim 1, wherein the processor is configured to use additional data from camera sensors, radars or high resolution radars, acoustical sensors or sonars, other data provided by signal processing and object detection from optical sensors, along with data fusion with data from a laser/light detection and ranging (LADAR or LIDAR) device.

19. The system of claim 1, wherein the communication interface is configured to receive data in-situ from chemical sensors, wherein the processor is configured to use geolocation-based processing.

20. The system of claim 1, wherein the processor is configured to operate with and receive input from ocean current models, waves models or wind models, including meta-ocean models, by fusing laser/light detection and ranging (LADAR or LIDAR) device data measurement at multiple locations and multiple time locations with historic/nowcast/forecast models, to detect a location of the macro-plastics, the micro-plastics, and the nano-plastics after a period of time.

21. The system of claim 1, wherein light is fed by flexible fiber optics to apertures in a fuselage and the system is operable in a surface or aircraft GPS configuration, an Inertial Navigation System (INS) configuration, and a laser beam at 1 milliradian or more configuration in accordance with user input.

22. The system of claim 1, wherein the system is operable in a configuration that can investigate specific areas in the environment to provide detailed data via a location on a stationary or hovering platform.

23. The system of claim 1, wherein the system is operable in a configuration that is configured to sample areas of the sea from above water level, wherein the system is further configured to be mounted on vessels or aircrafts while performing instantaneous measurements while sampling in a trajectory using side-scanning.

24. The system of claim 1, wherein the system is operable in a configuration wherein a LADAR/LIDAR sensor of one or more of the plurality of detection devices is supplemented with other sensors, and wherein the LADAR/LIDAR sensor and the other sensors form a kit that is configured to monitor a footprint of a certain geographical area, and wherein the system is configured to expand the footprint by scanning around the sensors for 360 degrees.

25. The system of claim 1, wherein the system is operable in a configuration in which the plurality of detection devices are organized into a plurality of kits, each kit having a similar footprint, such that kits are aligned in a line or a grid pattern and connected with fiber optics to a communication network, wherein each of the kits is configured either to scan in a dedicated footprint or in circles around a respective sensor.

26. The system of claim 1, wherein the system is operable in a configuration wherein at least one of the detection devices comprises a kit with a sensor, either on a fixed point or on a moving vehicle, is linked with a drift model, and wherein the processor is configured to determine the trajectories of the plastic while taking into account factors of wind fetch, wave interaction, or ocean currents, and to determine a final geographical location of the plastics, the macro plastics, the micro-plastics, and the nano-plastics over a period of time.

27. The system of claim 1, wherein the system is configured to operate irrespective of atmospheric or sea-state conditions based at least in part on a use of Golay coding of a laser waveform.

28. The system of claim 1, wherein the system is configured to be self-learning by automatic and manual feedback to provide accurate information and wherein the processor is configured to use Artificial Intelligence (AI) methods for self-learning and self-optimization when an object is identified and verified using correlation techniques to patterns, geo-structural information, chemical information, wherein the self-learning is used for plastic detection and identification.

29. The system of claim 1, wherein the system is modular such that electronics and sensors are arranged at different locations and separated by fiber optics.

30. The system of claim 1, wherein the system comprises a safety feature selected from one or more of: a programmable laser power, a controlled laser beam divergence, day and night operating modes, or a selectable wavelength including an eye safety wavelength.

31. A method for operating a system for detecting plastics, macro-plastics, micro-plastics and nano-plastics in a maritime, estuary or river environment, the method comprising:
  detecting, by a plurality of detection devices, plastics, the macro-plastics, the micro-plastics and the nano-plastics in an environment, wherein the detection devices use different detection wavelengths;
  receiving, by a communication interface, detection signals from the plurality of detection devices; and
  determining, by a processor, locations of the plastics, the macro-plastics, the micro-plastics and the nano-plastics in the environment based at least in part on the received detection signals within a common coordinate system.

32. An apparatus for detecting plastics, macro-plastics, micro-plastics, and nano-plastics in a maritime, estuary, or river environment, comprising:
- a processor; and
- a memory communicatively coupled with the processor, wherein the memory stores computer-readable program code that, when executed by the processor, causes the processor to:
  - receive detection signals from a plurality of detection devices, the plurality of detection devices using different detection wavelengths;
  - determine, based at least in part on the received detection signals, locations of the plastics, the macro-plastics, the micro-plastics, and the nano-plastics in the environment; and
  - identify and classify the detected plastics based at least in part on the received detection signals.

\* \* \* \* \*